UNITED STATES PATENT OFFICE 2,366,324

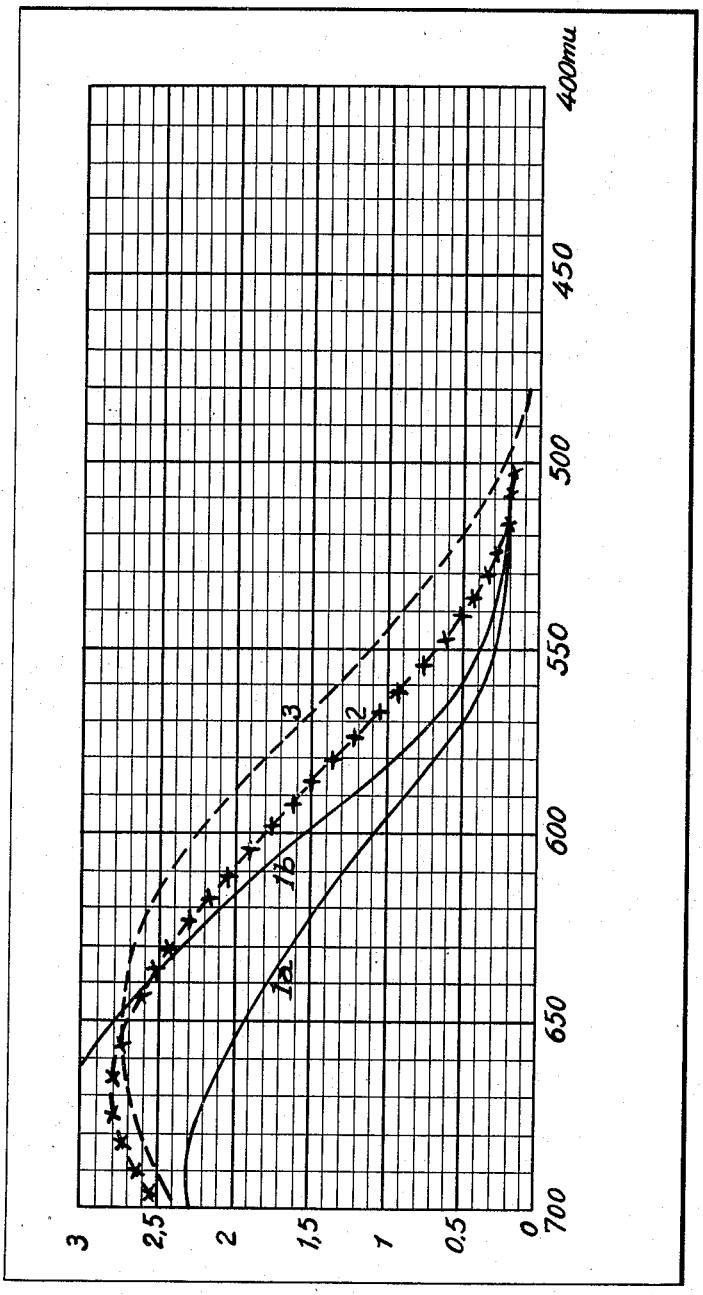

PRODUCTION OF COLOR PHOTOGRAPHIC IMAGES

Alfred Fröhlich and Wilhelm Schneider, Dessau, Germany, assignors to General Aniline & Film Corporation, New York, N. Y., a corporation of Delaware Application February 17, 1942, Serial No. 431,267
In Germany August 16, 1940

6 Claims. (Cl. 95—6)

Our present invention relates to color photographic images and more particularly to an improved process for the production of color images by color forming development.

It is known to produce color photographic images by using dyestuff formers in conjunction with a developing agent. The dyestuff former may be incorporated into the silver halide layer before the exposure and development or it may be dissolved in the solution containing the developing agent. By developing the latent silver image a dyestuff image is formed from the oxidation products of the developing agent and the dyestuff component in situ with the silver image after which the silver image is removed. This process for producing color images is especially suitable for the purposes of multi-color photography and has obtained practical importance in processes comprising the use of multi-layer materials. In these multi-layer processes, by which component dyestuff images are produced in the single emulsion layers, from the different dyestuff formers and the same developing agent and especially in a negative-positive process it is of great importance to control the tint of the several component images so as to comply with the theoretical requirements of the subtractive 3-color photography as completely as possible. In this negative-positive process it is necessary that the dyestuffs produced from the dyestuff formers have certain spectral properties. This process chiefly requires that the blue dyestuffs possess a good transmission in the green and blue parts of the spectrum. For the production of dyestuff formers which yield such blue dyestuffs it has, for instance, been proposed to halogenate enols and naphthols capable of coupling. This method, however, has the disadvantage, that the solubility of the naphthols is considerably reduced by the halogenation. As to pentabromnaphthol, for instance, it is practically impossible to dissolve a sufficient amount thereof in the developer. Moreover, it has been suggested to use phenols having a 6-membered ring fused thereon and containing nitrogen, i. e. hydroxyquinolines instead of the naphthols. However, the tint of the dyestuffs obtained with these hydroxyquinolines is hardly different from the analogous dyestuffs prepared from naphthols so that for practical purposes it is immaterial in general whether α-naphthols or quinolines are employed. It is finally known that three nuclei fused together such as 1-hydroxyanthracene yield blue-green dyestuffs having a strongly green color tone. But this dyestuff former is practically useless because due to its great sensitivity to air, developers containing it become black on standing in air in a short time. Hydroxyphenanthrenes likewise yield very greenish color tones. These compounds, however, have not been prepared as yet in sufficiently large amounts.

Reference is made to the accompanying drawing in which absorption curves of dyestuffs formed from the dyestuff components of the present invention are compared with absorption curves of dyestuffs derived from known components.

Our present invention is based on the observation that hydroxy compounds capable of coupling and substituted by a diphenyl radical which may also contain groups preventing diffusion and/or rendering the coupling component soluble in water are valuable dyestuff formers. The quinoneimine dyestuffs formed therefrom show an especially favorable absorption in the short-wave infra-red and a high transmission in the green part of the spectrum so that they are especially adapted to the negative process including the color forming development. The dyestuff components of the present invention are chiefly distinguished from the components previously proposed for forming green dyestuffs such as the halogenated phenols, halogenated naphthols, o-hydroxyphenylbenzal compounds and the hydroxycinnamic acids in that their constitutions readily permit further substitution by radicals favorably influencing the properties of said components. Properties which can be imparted thereto by such substituents are, for instance, fastness to diffusion with respect to gelatin and good solubility in diluted alkalies. It is also advantageous that the color tone of the dyestuffs formed from the components of the invention can be easily modified to any desired extent by introducing suitable substituents.

The hydroxy compounds capable of coupling according to the present invention include, for instance, phenols, cresols, xylenols, and hydroxyquinolines containing a diphenyl radical. Such compounds may also carry groups producing fastness to diffusion and radicals making them water-soluble. The dyestuff formers containing hydroxy groups may be combined with the diphenyl radical, for instance, by an acid amide linkage. By the same bridge the group preventing diffusion may also be linked to the diphenyl nucleus. Dyestuff formers of the type include the following compound:

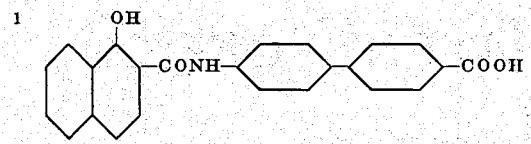

ortho-hydroxy-(p'-carboxy-N-diphenyl)-naphthylamide.

Preferably, however, the dyestuff formers contemplated by the present invention have the following structural formula:

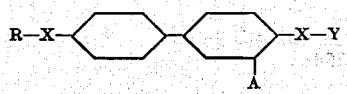

in which R is a phenol linked to X in ortho position to the phenolic hydroxyl group, X is a carbonamide or sulfonamide group, Y is a phenol linked to X in ortho position to the phenolic hydroxyl group, a hydrogenated ring system or an alkyl chain of more than five carbon atoms, and A is either hydrogen or an amide containing an alkyl chain of more than five carbon atoms, A always being the latter when Y is a phenol. Examples of compounds typified by said formula are:

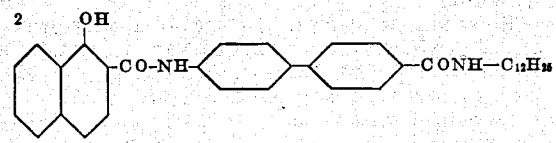

o-hydroxy-(p'-dodecylamido-N-diphenyl)-naphthylamide.

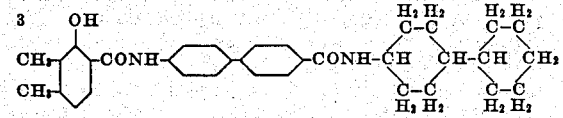

1-hydroxy-5.6-dimethyl-2-(p'-dicyclohexylamido-N-diphenyl) benzamide.

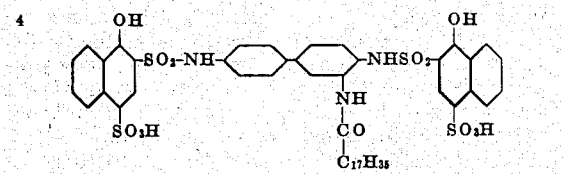

Bis [4''-sulfo-2''-(N)-sulfonyl-α-naphthol]-2'-stearylamidodiphenylamine.

In the drawing the curves 1a and 1b show the typical course of the absorption curves of two different concentrations of a dyestuff prepared from the component having the Formula No. 4 and p-dimethylaminoaniline compared with the absorption curves of known dyestuffs formed from trichlornaphthol (curve 2) and 2,4-dibromnaphthol (curve 3) and p-dimethylaminoaniline.

The substituents preventing diffusion include the radicals disclosed in the following patents and applications:

U. S. Patents 2,154,918 dated April 18, 1939; 2,156,821 dated May 2, 1939; 2,178,612, 2,179,244, 2,179,238 dated November 7, 1939; 2,186,045, 2,186,685, 2,186,719, 2,186,732, 2,186,733, 2,186,734, 2,186,735, 2,186,847, 2,186,849, 2,186,850, 2,186,851, 2,186,852 dated January 9, 1940; 2,200,306 dated May 14, 1940, and 2,214,483 dated September 10, 1940, and U. S. Patents 2,293,004, 2,280,722, 2,292,575, 2,307,399, 2,320,422, 2,357,393 and 2,341,372; French Patents 344,648, 344,649 and 834,402; and U. S. Patent application Ser. No. 284,258 filed July 13, 1939.

Especially valuable radicals producing fastness to diffusion are straight or branched carbon chains having more than 5 carbon atoms and hydroaromatic nuclei, if necessary, in conjunction with aromatic nuclei or carbon chains. Such compounds are either synthetically produced such as perhydrodiphenylamine or they occur in nature such as abietic acid. They may also be transformation products of natural products as, for instance, abietylamine or cholesterylamine.

The dyestuff formers of the present invention may be added either to the color developer or to the silver halide emulsion before casting. In the latter case it is to be preferred to use dyestuff formers having radicals preventing diffusion and, if necessary, groups rendering the components soluble. In general 3 g. of the component are dissolved in 100 cc. of water with an addition of 10 cc. of n/1 sodium hydroxide solution. The mixture is then added to 300 cc. of a silver halide emulsion whereupon the emulsion is cast to form a layer. The exposed layer is developed with a soda-alkaline solution of p-dimethylaminoaniline, fixed and freed from silver. One obtains a green dyestuff image.

The following examples illustrate the invention but they are not intended to be limiting.

*Example 1*

0.5 g. of the sodium salt of α-hydroxynaphthoyl-4-aminodiphenyl-4'-carboxylic acid is added to 100 cc. of a dimethylaminoaniline developer. By treating the latent image with this developer a green dyestuff image is obtained in situ with the silver image which may be removed by a Farmer's reducer (potassium ferricyanide solution).

*Example 2*

3 g. of bis-(1.1'-hydroxy-2.2'-naphthoyl-3''-stearylaminobenzidine)-4.4'-disulfonic acid are dissolved in 10 cc. of n/1 sodium hydroxide solution and 100 cc. of water. The solution obtained is added to 300 cc. of a silver halide gelatin emulsion. The emulsion is then cast to form a layer. The exposed layer is developed with a solution of p-dimethylaminoaniline, fixed and freed from silver whereby a green dyestuff image is produced. This emulsion is especially adapted to a multilayer material.

Instead of the sodium salt other soluble salts of the dyestuff former may be used, for instance other alkali metal salts.

Groups making the dyestuff former soluble in water are, for instance, sulfo, carboxyl and hydroxyl. They may also be carried by the diphenyl or the radicals producing fastness to diffusion. These radicals in turn may also be introduced into the diphenyl radical.

We claim:

1. In a process of producing color photographic images by color forming development, the improvement which comprises developing an exposed silver halide emulsion with an aromatic primary amino developer in the presence of a soluble salt of a compound having the following general formula:

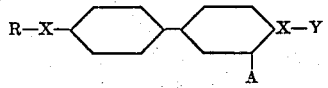

wherein R is a phenol which is linked to X in ortho position to the phenolic hydroxyl group, X is a group selected from the class consisting of carbonamide and sulfonamide groups, Y is a member of the class consisting of phenols linked to X in ortho position to the phenolic hydroxyl group, hydrogenated ring systems and alkyl chains of more than five carbon atoms, and A is a member of the class consisting of hydrogen and amides containing an alkyl chain of more than five carbon atoms, A always being the latter when Y is a phenol.

2. In a process of producing color photographic images by color forming development, the improvement which comprises developing with an aromatic primary amino developer, an exposed silver halide emulsion containing a soluble salt of a compound having the following general formula:

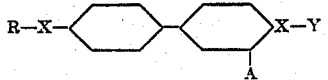

wherein R is a phenol which is linked to X in ortho position to the phenolic hydroxyl group, X is a group selected from the class consisting of carbonamide and sulfonamide groups, Y is a member of the class consisting of phenols linked to X in ortho position to the phenolic hydroxyl group, hydrogenated ring systems and alkyl chains of more than five carbon atoms, and A is a member of the class consisting of hydrogen and amides containing an alkyl chain of more than five carbon atoms, A always being the latter when Y is a phenol.

3. A silver halide emulsion for color forming development containing a soluble salt of a compound having the following general formula:

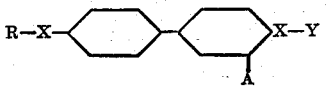

wherein R is a phenol which is linked to X in ortho position to the phenolic hydroxyl group, X is a group selected from the class consisting of carbonamide and sulfonamide groups, Y is a member of the class consisting of phenols linked to X in ortho position to the phenolic hydroxyl group, hydrogenated ring systems and alkyl chains of more than five carbon atoms, and A is a member of the class consisting of hydrogen and amides containing an alkyl chain of more than five carbon atoms, A always being the latter when Y is a phenol.

4. A silver halide emulsion for color forming development containing a soluble salt of a compound of the following formula:

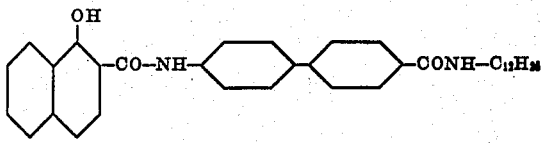

5. A silver halide emulsion for color forming development containing a soluble salt of a compound of the following formula:

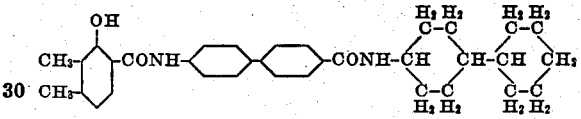

6. A silver halide emulsion for color forming devolpment containing a soluble salt of a compound of the following formula:

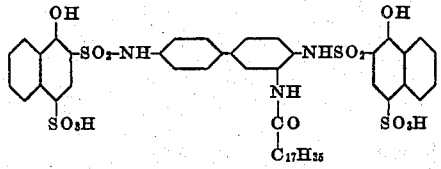

ALFRED FRÖHLICH.
WILHELM SCHNEIDER.